(12) United States Patent
Skinner et al.

(10) Patent No.: US 8,699,642 B2
(45) Date of Patent: Apr. 15, 2014

(54) PLATFORM RFI MITIGATION

(75) Inventors: Harry G. Skinner, Beaverton, OR (US); Dawson W. Kesling, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 12/975,469

(22) Filed: Dec. 22, 2010

(65) Prior Publication Data

US 2012/0163522 A1  Jun. 28, 2012

(51) Int. Cl.
H04L 25/08  (2006.01)
(52) U.S. Cl.
USPC .......................................... 375/346; 375/296
(58) Field of Classification Search
USPC ................. 375/130, 219, 285, 296, 346
See application file for complete search history.

(56) References Cited

U.S. PATENT DOCUMENTS

| | | | | |
|---|---|---|---|---|
| 5,960,341 A * | 9/1999 | LeBlanc et al. | ............ | 455/426.1 |
| 7,389,095 B1 * | 6/2008 | Liu et al. | ....................... | 455/260 |
| 2003/0200357 A1 * | 10/2003 | Yanosy | .......................... | 709/328 |
| 2004/0001533 A1 * | 1/2004 | Tran et al. | ...................... | 375/141 |
| 2008/0063130 A1 | 3/2008 | Chen | | |
| 2008/0081586 A1 * | 4/2008 | Sreerama et al. | ............. | 455/255 |
| 2008/0231331 A1 * | 9/2008 | Balraj et al. | ................... | 327/145 |
| 2008/0240313 A1 * | 10/2008 | Deisher et al. | ................ | 375/346 |
| 2009/0080498 A1 * | 3/2009 | Deisher et al. | ................ | 375/136 |
| 2009/0080583 A1 | 3/2009 | Skinner et al. | | |
| 2009/0141774 A1 * | 6/2009 | Araki et al. | ................... | 375/130 |
| 2010/0158169 A1 | 6/2010 | Sreerama et al. | | |

FOREIGN PATENT DOCUMENTS

WO  2012/087599 A2  6/2012
WO  2012/087599 A3  8/2012

OTHER PUBLICATIONS

International Search Report and Written Opinion received for PCT Application PCT/US2011/064046 mailed on Jun. 25, 2012, 9 Pages.

* cited by examiner

*Primary Examiner* — Shuwang Liu
*Assistant Examiner* — David Huang
(74) *Attorney, Agent, or Firm* — Patent Capital Group

(57) ABSTRACT

In some embodiments, SSC (e.g., discrete SSC) profiles with intentional and controlled gaps may be used to mitigate interference for platform radios. Targeted frequency gaps are placed in spectrum of spread clocks and clock-derived signals where they may otherwise result in problematic RFI to a platform radio.

17 Claims, 4 Drawing Sheets

PLATFORM RFI MITIGATION

TECHNICAL FIELD

The present invention relates generally to computing devices with radio components and in particular, to computing devices with clock adjustment features for mitigating against detrimental RFI.

BACKGROUND

Wireless computing platforms (or computing platforms) may communicate using one or more wireless communication channels. With today's wireless platforms it is not possible to completely avoid platform radio frequency interference (RFI). Platform components typically include clocks that, during operation, may generate harmonics that overlap with the frequency range of at least one wireless (radio) channel. In some platforms, the close proximity of the clocks and wireless transceivers may introduce significant RFI with one or more wireless channels. The effect of the RFI may be to significantly reduce the data rate and/or operating range of the wireless channel.

Some computing platforms use spread spectrum clock (SSC) modulation to minimize electromagnetic emissions and ease compliance with regional electromagnetic interference (EMI) regulations. For example, FIG. 1A is a graph showing the spectrum of a harmonic near a WiFi 2.5 GHz band of an un-spread 100 MHz clock (e.g., used to generate a PCI Express clock on the platform). FIG. 1C is a plot showing the spectrum of the same harmonic after 1% of conventional triangular center-spread SSC modulation is applied. (FIG. 1B shows one cycle of a typical spread spectrum clocking profile with 1% peak-to-peak amplitude and 30 KHz frequency.) Also shown in FIG. 1C is a particular WiMax channel.

SSC implementations generally reduce the peak electromagnetic energy to attain EMI compliance by spreading energy across adjacent frequencies. As seen in FIG. 1C, the peak energy has been reduced, but the energy has been spread into a WiMax channel, along with adjacent WiFi channels. So, while such SSC modulation can redress EMI issues, unfortunately, the energy is often spread into sensitive areas used by platform radios to receive information. Since platform radios are typically sensitive to noise levels below EMI limits (typically 30 to 40 dB more sensitive), this behavior can seriously degrade radio performance.

Accordingly, a new approach for impeding wireless interference while being able to maintain EMI compliance, if possible, is needed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In some embodiments, SSC (e.g., discrete SSC) profiles with intentional and controlled gaps may be used to mitigate interference for platform radios. Targeted frequency gaps are placed in spectrum of spread clocks and clock-derived signals where they may otherwise result in problematic RFI to a platform radio. The gaps are suitably aligned with wireless platform channels or other bands of interest to mitigate interference with platform radio operation. The gaps are controlled by design of the spread profile.

Figure 1A:
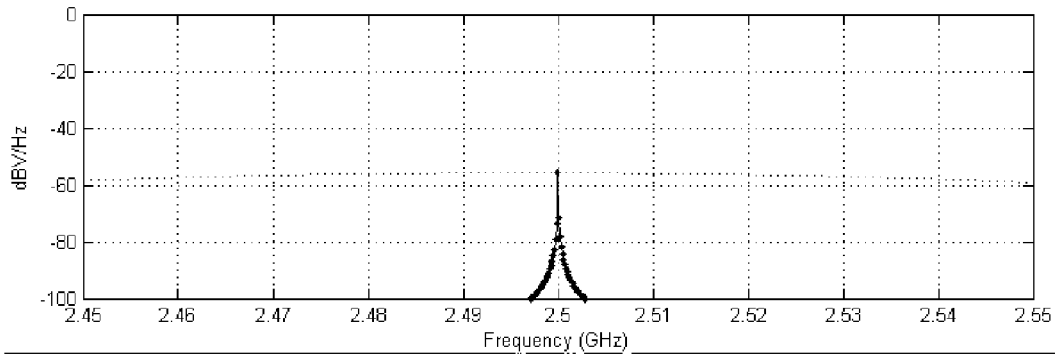
FIG. 1A is a graph showing platform RFI generated by a platform clock harmonic.
Figure 1B:
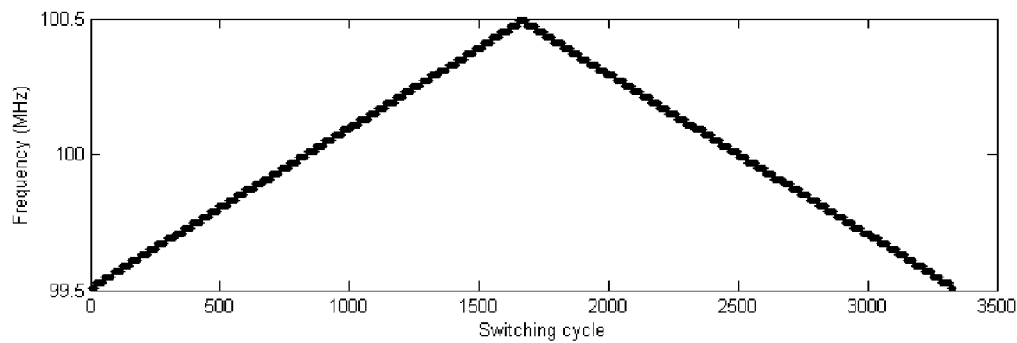
FIG. 1B is a graph showing a spread spectrum clock (SSC) profile to be applied to the clock generating the harmonic of FIG. 1A.
Figure 1C:
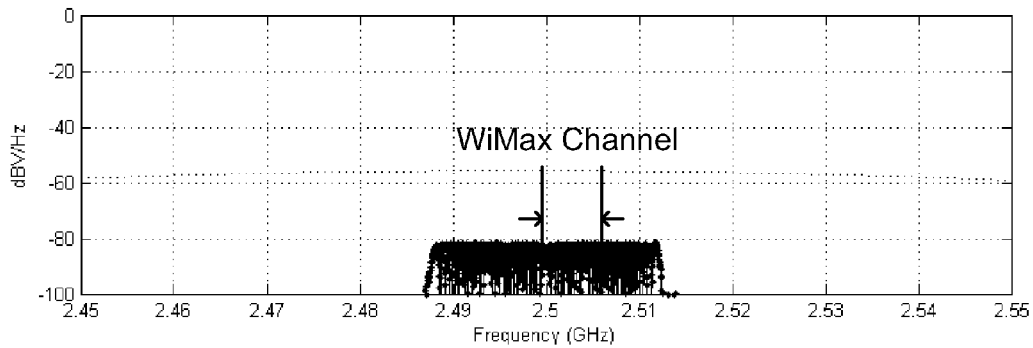
FIG. 1C is a graph showing platform RFI generated by the clock of FIG. 1A after it has been modulated using an SSC profile of FIG. 1B.
Figure 2A:
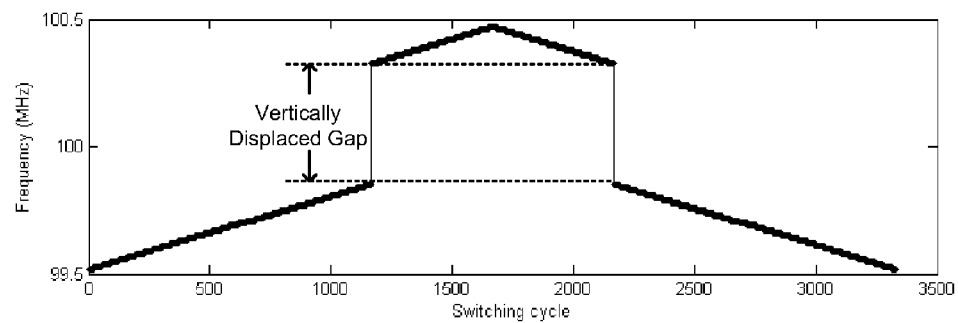
FIG. 2A is a graph showing an SSC profile for the clock of FIG. 1A to generate a notched spectrum in accordance with some embodiments.
Figure 2B:
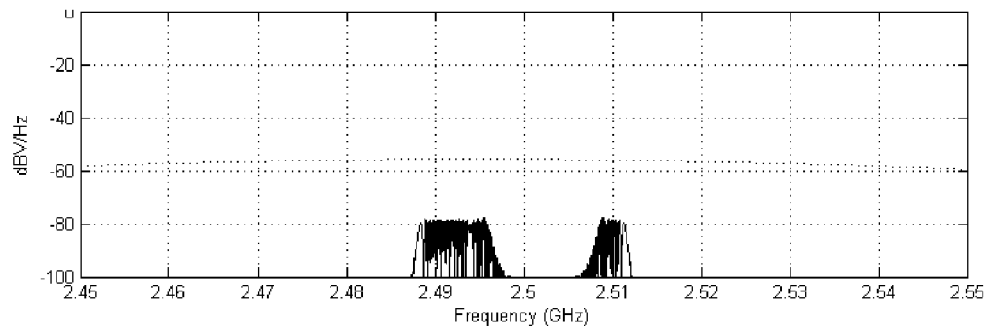
FIG. 2B is a graph showing the notched RFI spectrum resulting from application of the SSC profile of FIG. 2A in accordance with some embodiments.

FIG. 2A is an example of a particular discrete SSC profile that may be used to spread out spectral energy in order to comply with EMI requirements and at the same time, notch out energy for a platform channel of interest. (In the depicted example, the notch location corresponds to the WiMax channel from FIG. 1C.) FIG. 2B is the resulting spectrum for the 2.5 GHz harmonic. It shows that an RFI notch is created for a WiMax channel.

In general, any SSC profile (e.g., triangular, sinusoidal, Hershey Kiss™ (Lexmark), etc.) may be used, so long as it includes sufficient reductions, if not complete omissions, of frequency components of interest. For example, with the profile of FIG. 2A, use of frequencies ranging from about 99.8 to 100.3 MHz are omitted. This appears as a vertically displaced gap, or at least fairly "steep", steps in the profile. To implement such profiles, discrete spread spectrum clocking (DSSC) may be preferred, if not required. (Note that as used herein, "vertically displaced" means to have a substantial vertical component, but exclusively vertical, i.e., rectangular shaped, gaps are not required. Ramps, e.g., steep ramps, may also be suitable, depending on design considerations. So, a trapezoidal shaped, rather than rectangular shaped, gap may be sufficient.) Persons of ordinary skill in the art should be sufficiently familiar with DSSC technologies. As an example of a DSSC implementation, reference is made to U.S. patent application Ser. No. 11/726,911 entitled: SPREAD SPECTRUM CLOCK GENERATOR, which is incorporated by reference herein.

When designing an SSC profile to notch out frequency bands of interest, different factors may be considered. For example, upper harmonic notches will be wider than the notch from a clock's fundamental frequency or other lower harmonics. So, for example, if a 100 MHz. clock is to be spread, and the notch is to avoid problematic harmonics over a 10 MHz band centered at 2.5 GHz, only a 0.4 MHz. notch (99.8 to 100.2 MHz) is ACTUALLY required to attain a 10 M Hz. notch (2.495 to 2.505 GHz) in the RFI energy spectrum region of interest where the 2.5 GHz harmonic would otherwise be located. Other considerations may be made. In some embodiments, the notch width (corresponding to height of vertical components in the utilized profile) should be weighed against EMI compliance considerations. that is, the energy must go somewhere. Wider notches will typically result in higher energy contours surrounding the notch. Along these lines, it may be desirable to make the profile symmetrical above and below the notch region of the profile, resulting in a more symmetrical energy spread on either side of the spectral notch. This may also make it easier to achieve EMI compliance. Note also, that while sharp notches may be desired, they may not be as easy to practically implement, because, for example, limitations in attainable SSC profile verticality and PLL/DLL (phase locked loop/delay locked loop) tracking limitations may make such sharp notches prohibitive.

Figure 3:
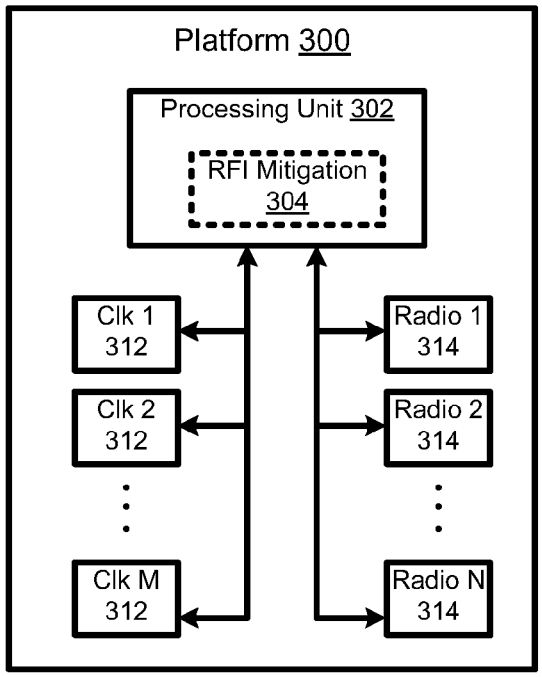
FIG. 3 is a diagram showing a computing platform with RFI mitigation using SSC in accordance with some embodiments.

FIG. 3 is a block diagram of a portion of a computing platform 300 implementing principles of the invention. The depicted diagram illustrates the platform 300 comprising a processing unit 302, controllable clock generators (a.k.a. clock sources or clocks) 312, and radios 314. The processing unit 302 may be part of any suitable processing logic, e.g., part of a processor core, System-on-chip, controller, dedicated logic, etc. It comprises RFI mitigation logic 304 to control the spread spectrum clocking (SSC), as needed or desired, of the clocks 312 to mitigate against problematic RFI on radios 314.

The clocks 312 may be part of or used for various different devices in the platform. For example, they could be used for memory interfaces, display clocking, peripheral device interfaces such as for USB interfaces, PCIe interfaces, storage drive (e.g., SATA) interfaces, and the like. In some cases, previous solutions such as shifting the clock frequencies to avoid sensitive RFI regions may not be feesible since many clocks require extremely tight frequency deviation tolerances. For example, DATA and DVI interface specifications can require less than 0.5% deviation from a fixed, predefined fundamental frequency.

The radios 314 correspond to the one or more various radios that may be part of a platform. (Note that the term "platform" is intended to encompass any computing platform, portable or not portable, that can take advantage of the RFI mitigation principles presented herein. Examples of platforms include but are not limited to cellular telephones, tablets, netbook computers, notebook computers, internet television devices, MP3 players, some personal computers, and the like.) A platform may have one or more radios for providing it with different services including but not limited to wireless packet data network connectivity (e.g., WiFi), GPS, cellular network connectivity (e.g., LTE, WiMax, GSM, etc.), and the like.

Figure 4:
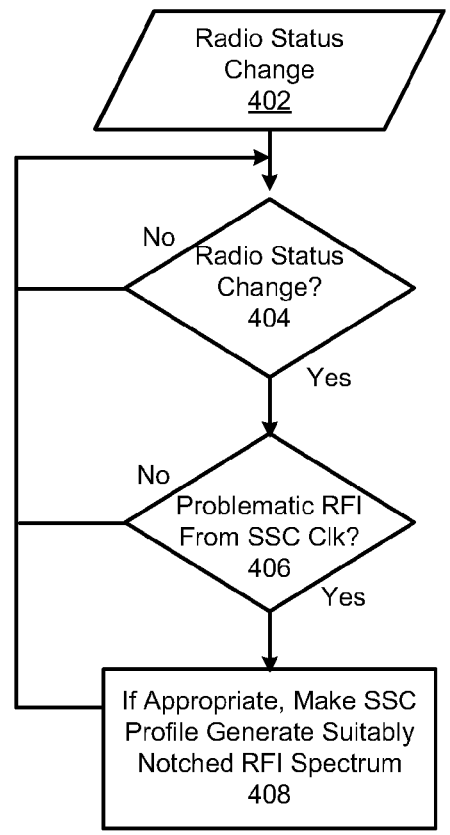
FIG. 4 is a flow diagram showing a routine for mitigating problematic RFI in the platform of FIG. 3 in accordance with some embodiments.

FIG. 4 is a flow diagram showing a routine that could be performed by RFI mitigation logic 304 in accordance with some embodiments. Essentially, at 404, it waits for a radio status change (402) from one of the radios 314. Such a change could be a change in activity state (e.g., on, off, idle, etc.), or it could indicate that the radio is changing its active channel. (Note that in alternative embodiments, it could proactively check for changes or check and/or wait for changes.) At 406, it determines if the radio will be impacted by problematic RFI from a clock 312 with controllable SSC capability on the platform. If so, then at 408, if appropriate, it changes the clock(s)' SSC profile so that it generates a notched energy spectrum so that the clock RFI does not harmfully impact the radio. At the same time, if possible, it should enable the clock(s) to comply with its required frequency performance and EMI limitation requirements. (Note that not every clock may be changed in this manner. For example, it might be decided that the clock's frequency tolerance is wide enough that the clock frequency can be shifted instead of notching its energy spectrum.) In deciding whether a clock is problematic, the logic 302 may calculate or otherwise look-up the possible energy created for the various harmonics of a clock to see if the clock will impact the radio channel. If at 406, it was determined that there is not an SSC clock that should be changed, then the routine loops back to 404 and waits for another radio status change.

Figure 5:
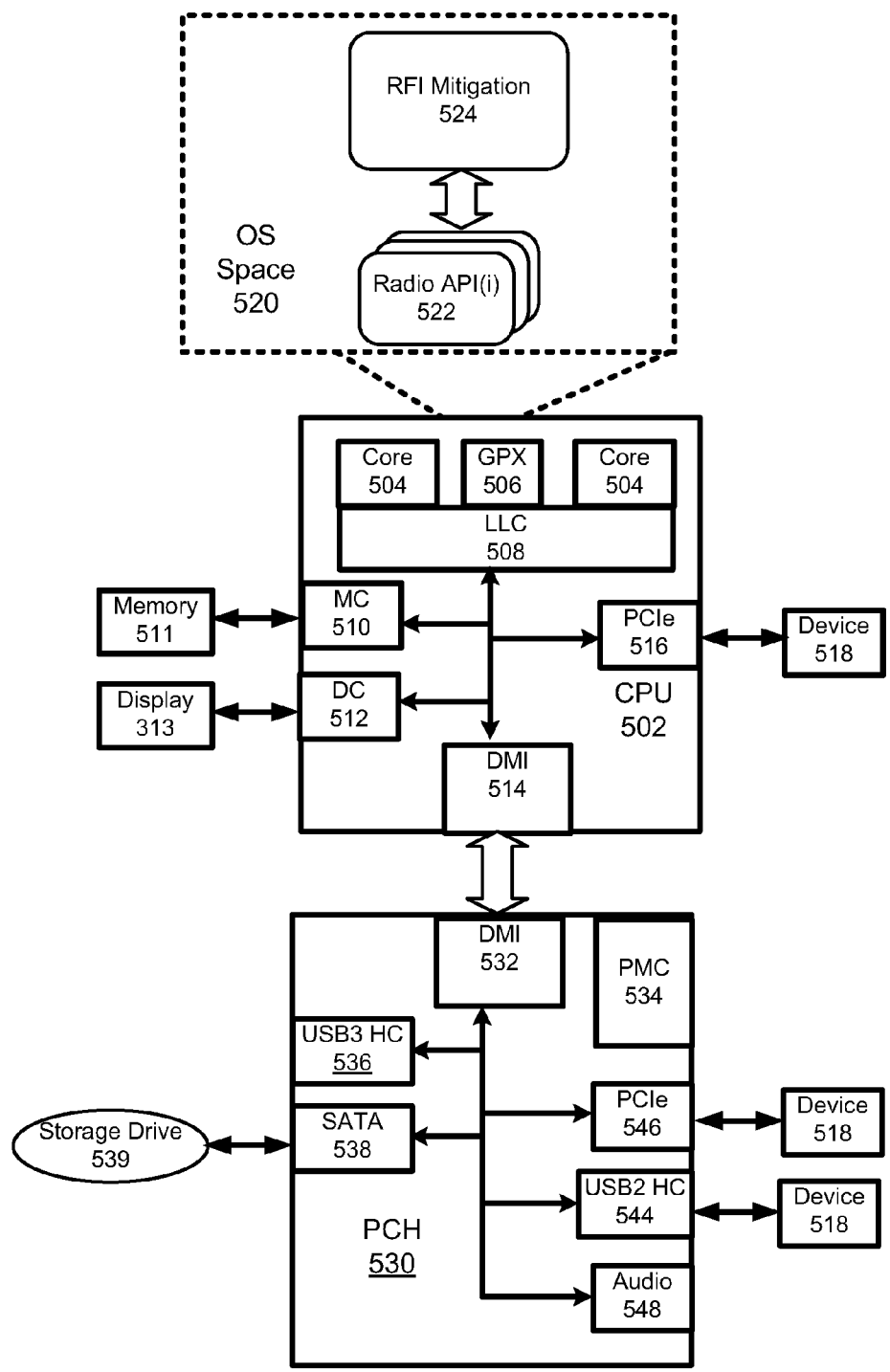
FIG. 5 is a diagram of another computing platform with SSC RFI mitigation in accordance with some embodiments.

FIG. 5 is a diagram of a computing platform with RFI mitigation in a portable computer implementation. The depicted platform comprises a CPU chip 502 coupled to a platform control hub (PCH) 530 via a direct media interconnect (DMI) interface 514/532. The platform also includes memory 511 coupled through a memory controller 510 and a display 513 coupled through a display controller 512. It also includes a storage drive 539 (e.g., a solid state drive) coupled through a drive controller such as the depicted SATA controller 538 and devices 518 (e.g., network interface, WiFi interface, printer, camera, cellular network interface, etc.) coupled through platform interfaces such as PCI Express (516 in the CPU chip and 546 15401 in the PCR chip) and USB interfaces 536, 544.

The CPU chip 502 comprises one or more processor cores 504, a graphics processor 506, and last level cache (LLC) 508. One or more of the cores 504 execute operating system software (OS space) 520, which comprises radio APIs (application platform interfaces) 522 and an RFI mitigation program 524. The radio APIs 522 each monitor or link to a separate radio (e.g., in a WiFi, cellular, or GPS device 518), among other reasons, to determine if their status has changed and to report the status change to the RFI mitigation program 524. It should also convey to the RFI mitigation program the particular channel information for its associated radio. The RFI mitigation program 524 then performs a routine such as the one shown in FIG. 4 to control, via SSC notching, any problematic clocks in the platform to generate energy with notches to avoid unreasonably impairing a radio. (Note that while in this embodiment, the RFI mitigation logic 524 is implemented with software in the OS, it could be implemented in any suitable manner. For example, it could be implemented in firmware, either on the CPU or PCH chip.)

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a diagram. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
   a radio;
   a spread spectrum clock (SSC) having an associated SSC profile; and
   mitigation logic to control the profile to generate a notch in a radio frequency interference (RFI) energy spectrum, the notch to align with a wireless channel to be used by the radio, wherein the notch is to mitigate interference for the wireless channel, and wherein a width associated with the notch is based, at least in part, on at least one electromagnetic interference (EMI) compliance characteristic.

2. The apparatus of claim 1, wherein the radio is part of a wireless interface.

3. The apparatus of claim 1, wherein the radio is part of a global positioning system (GPS) module.

4. The apparatus of claim 1, wherein the SSC is spreadable through discrete spread spectrum clocking.

5. The apparatus of claim 4, wherein a triangular discrete spread spectrum clocking (DSSC) profile with a vertical gap corresponding to the channel to be used by the radio is employed.

6. The apparatus of claim 4, wherein a non-triangular DSSC profile with a vertical gap corresponding to the channel to be used by the radio is employed.

7. The apparatus of claim 1, wherein the mitigation logic is implemented with operating system software.

8. The apparatus of claim 1, wherein the mitigation logic is implemented with firmware.

9. A computing platform, comprising:
   mitigation logic;
   devices with radios, each device to operate in at least one channel to be reported to the mitigation logic; and
   clocks that are to be spread using discrete spread spectrum clocking (DSSC), the DSSC for each clock to be controlled via a DSSC profile, the mitigation logic to select a profile for a clock that results in a notched spectrum to mitigate interference with the at least one channel, and wherein the notched spectrum includes a plurality of notches that are based, at least in part, on at least one electromagnetic interference (EMI) compliance characteristic, and wherein triangular profiles with vertically displaced gaps are used to create the plurality of notches.

10. The computing platform of claim 9, comprising a processor chip to execute an operating system that incorporates the mitigation logic.

11. The computing platform of claim 10, in which the operating system incorporates application program interfaces (APIs) to report status changes including channel usage for the device radios.

12. The computing platform of claim 9, comprising a chip including firmware to implement the mitigation logic.

13. The computing platform of claim 9, in which the mitigation logic is in a separate DSSC module for each clock.

14. A method, comprising means for:
   determining that a radio in a computing platform is to receive information over a wireless channel;
   determining whether a clock in the platform will generate problematic radio frequency interference (RFI) in the wireless channel; and
   causing spread spectrum clocking (SSC) to be performed on the clock, the SSC using a profile that will result in an RFI spectrum with a notch in at least part of the channel region, wherein the notch is to mitigate interference for the wireless channel, and wherein a width associated with the notch is based, at least in part, on at least one electromagnetic interference (EMI) compliance characteristic.

15. The method of claim 14, in which the method is performed by RFI logic in a computing platform.

16. The method of claim 14, in which the SSC is discrete SSC.

17. The method of claim 16, in which a triangular profile with a vertically displaced gap is used.

* * * * *